US 9,768,908 B2

(12) United States Patent
Kaneko et al.

(10) Patent No.: US 9,768,908 B2
(45) Date of Patent: Sep. 19, 2017

(54) PROTECTION METHOD AND OPTICAL COMMUNICATION SYSTEM

(71) Applicant: NIPPON TELEGRAPH AND TELEPHONE CORPORATION, Tokyo (JP)

(72) Inventors: Shin Kaneko, Yokosuka (JP); Tomoaki Yoshida, Yokosuka (JP); Shunji Kimura, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1 day.

(21) Appl. No.: 15/027,398

(22) PCT Filed: Oct. 22, 2014

(86) PCT No.: PCT/JP2014/078025
§ 371 (c)(1),
(2) Date: Apr. 5, 2016

(87) PCT Pub. No.: WO2015/060325
PCT Pub. Date: Apr. 30, 2015

(65) Prior Publication Data
US 2016/0248539 A1    Aug. 25, 2016

(30) Foreign Application Priority Data
Oct. 25, 2013    (JP) .................................. 2013-222130

(51) Int. Cl.
*G02F 1/00*        (2006.01)
*G02F 2/00*        (2006.01)
(Continued)

(52) U.S. Cl.
CPC ...... *H04J 14/0297* (2013.01); *H04J 14/0282* (2013.01); *H04J 14/0295* (2013.01);
(Continued)

(58) Field of Classification Search
CPC ............... H04J 14/0297; H04J 14/0282; H04J 14/0295; H04Q 11/0066;
(Continued)

(56) References Cited

U.S. PATENT DOCUMENTS 6,771,908 B2 * 8/2004 Eijk ..................... H04B 10/032
398/100
8,014,672 B2 * 9/2011 Suzuki ............... H04B 10/0793
398/135
(Continued)

FOREIGN PATENT DOCUMENTS

JP    2009-88785 A    4/2009
JP    2009-290594 A   12/2009

OTHER PUBLICATIONS

International Preliminary Report on Patentability dated May 6, 2016 from corresponding International Patent Application No. PCT/JP2014/078025, 7 pages.
(Continued)

*Primary Examiner* — Ken N Vanderpuye
*Assistant Examiner* — Abbas H Alagheband
(74) *Attorney, Agent, or Firm* — Ohlandt, Greeley, Ruggiero & Perle, L.L.P

(57) ABSTRACT

A protection method wherein an ONU switches a reception wavelength to a backup wavelength so as to be logically connected to a backup OSU designated in advance for each ONU when the ONU detects a failure in an OSU to which the ONU is originally assigned, while the ONU keeps on holding its own connection information with the OLT. In the OLT, a backup OSU for the ONU which is originally assigned to the failed OSU is notified of the information on the ONU when the OLT detects a failure in an OSU. In this way, the ONUs which are originally assigned to the failed OSU resumes communication in a short period.

14 Claims, 14 Drawing Sheets

(51) Int. Cl.
- *H04B 10/00* (2013.01)
- *H04J 14/00* (2006.01)
- *H04J 14/02* (2006.01)
- *H04Q 11/00* (2006.01)

(52) U.S. Cl.
CPC . *H04Q 11/0066* (2013.01); *H04Q 2011/0016* (2013.01); *H04Q 2011/0043* (2013.01); *H04Q 2213/1301* (2013.01); *H04Q 2213/13295* (2013.01)

(58) Field of Classification Search
CPC ... H04Q 2011/0016; H04Q 2011/0043; H04Q 2213/1301; H04Q 2213/13295
USPC .......................................................... 398/5
See application file for complete search history.

(56) References Cited

U.S. PATENT DOCUMENTS

| | | | | |
|---|---|---|---|---|
| 8,824,899 B2* | 9/2014 | Yamashita | ............ | H04J 3/1694 398/1 |
| 8,953,936 B2* | 2/2015 | Hood | ................... | H04B 10/032 398/66 |
| 9,179,204 B2* | 11/2015 | Mitsui | ................ | H04Q 11/0067 |
| 9,638,544 B2* | 5/2017 | Kondo | ................... | G01D 4/002 |
| 2002/0071149 A1* | 6/2002 | Xu | ........................ | H04B 10/032 398/5 |
| 2007/0058973 A1* | 3/2007 | Tanaka | ................. | H04B 10/032 398/1 |
| 2009/0016726 A1* | 1/2009 | Suzuki | ............... | H04B 10/0793 398/79 |
| 2010/0098407 A1* | 4/2010 | Goswami | ............. | H04B 10/032 398/5 |
| 2011/0026926 A1* | 2/2011 | Yamashita | ............ | H04J 3/1694 398/79 |
| 2011/0038629 A1* | 2/2011 | Johansson | ............ | H04B 10/272 398/58 |
| 2011/0103792 A1* | 5/2011 | Kimura | ................ | H04B 10/032 398/2 |
| 2013/0266306 A1* | 10/2013 | Kozaki | ................. | H04J 3/0655 398/5 |
| 2014/0093232 A1* | 4/2014 | Hood | ................... | H04B 10/032 398/5 |
| 2014/0199062 A1* | 7/2014 | In De Betou | ......... | H04W 24/04 398/5 |
| 2014/0219654 A1* | 8/2014 | Mitsui | ................ | H04Q 11/0067 398/45 |
| 2014/0270770 A1* | 9/2014 | Lutgen | ................ | H04J 14/0221 398/66 |
| 2015/0003822 A1* | 1/2015 | Fukada | ................ | H04B 10/032 398/2 |
| 2016/0269105 A1* | 9/2016 | Yoshida | ............... | H04B 10/032 |

OTHER PUBLICATIONS

International Search Report dated Jan. 20, 2015 from International Application No. PCT/JP2014/078025, 3 pages.
Written Opinion dated Jan. 20, 2015 from International Application No. PCT/JP2014/078025, 3 pages.
Kimura, S.; "WDM/TDM-PON Technologies for Future Flexible Optical Access Networks"; 15th OptoElectronics and Communications Conference (OECC2010) Technical Digest, Jul. 2010, Sapporo Convention Center, Japan, pp. 14-15.
Sarashina et al.; "Study of link-up time in λ-tunable WDM/TDM-PON with wavelength swept system", Mar. 2013, 4 pages.
Tamaki et al.; "λ-Tunable WDM/TDM-PON System for Future Optical Access Network"; The Institute of Electronics, Information and Communication Engineers, 2012, 14 pages.

* cited by examiner

| Optical Fiber Transmission Line-side PORT | OSU-SIDE PORT ||||||||
|---|---|---|---|---|---|---|---|---|
| | #1 | #2 | #3 | ... | #M-1 | #M | | |
| #1 | $\lambda_{D\_1}$ | $\lambda_{D\_N}$ | $\lambda_{D\_N-1}$ | • • | $\lambda_{D\_N-M+3}$ | $\lambda_{D\_N-M+2}$ | | |
| #2 | $\lambda_{D\_2}$ | $\lambda_{D\_1}$ | $\lambda_{D\_N}$ | • • | $\lambda_{D\_N-M+4}$ | $\lambda_{D\_N-M+3}$ | | |
| #3 | $\lambda_{D\_3}$ | $\lambda_{D\_2}$ | $\lambda_{D\_1}$ | • • • | $\lambda_{D\_N-M+5}$ | $\lambda_{D\_N-M+4}$ | | |
| ... | • • | • • | • • • | | • • | • • | | |
| #M | $\lambda_{D\_M}$ | $\lambda_{D\_M-1}$ | $\lambda_{D\_M-2}$ | • • • | $\lambda_{D\_2}$ | $\lambda_{D\_1}$ | | |
| | • • | • • | • • | | • • | • • | | |
| #N-1 | $\lambda_{D\_N-1}$ | $\lambda_{D\_N-2}$ | $\lambda_{D\_N-3}$ | | $\lambda_{D\_N-M+1}$ | $\lambda_{D\_N-M}$ | | |
| #N | $\lambda_{D\_N}$ | $\lambda_{D\_N-1}$ | $\lambda_{D\_N-2}$ | | $\lambda_{D\_N-M+2}$ | $\lambda_{D\_N-M+1}$ | | |

FIG. 8

| Optical Fiber Transmission Line-side PORT | OSU-SIDE PORT | | | | | | |
|---|---|---|---|---|---|---|---|
| | #1 | #2 | #3 | ... | #M-1 | #M |
| #1 | $\lambda_{U\_1}$ | $\lambda_{U\_N}$ | $\lambda_{U\_N-1}$ | ... | $\lambda_{U\_N-M+3}$ | $\lambda_{U\_N-M+2}$ |
| #2 | $\lambda_{U\_2}$ | $\lambda_{U\_1}$ | $\lambda_{U\_N}$ | ... | $\lambda_{U\_N-M+4}$ | $\lambda_{U\_N-M+3}$ |
| #3 | $\lambda_{U\_3}$ | $\lambda_{U\_2}$ | $\lambda_{U\_1}$ | ... | $\lambda_{U\_N-M+5}$ | $\lambda_{U\_N-M+4}$ |
| ... | ... | ... | ... | ... | ... | ... |
| #M | $\lambda_{U\_M}$ | $\lambda_{U\_M-1}$ | $\lambda_{U\_M-2}$ | ... | $\lambda_{U\_2}$ | $\lambda_{U\_1}$ |
| ... | ... | ... | ... | | | |
| #N-1 | $\lambda_{U\_N-1}$ | $\lambda_{U\_N-2}$ | $\lambda_{U\_N-3}$ | | $\lambda_{U\_N-M+1}$ | $\lambda_{U\_N-M}$ |
| #N | $\lambda_{U\_N}$ | $\lambda_{U\_N-1}$ | $\lambda_{U\_N-2}$ | | $\lambda_{U\_N-M+2}$ | $\lambda_{U\_N-M+1}$ |

PROTECTION METHOD AND OPTICAL COMMUNICATION SYSTEM

BACKGROUND

1. Field of the Disclosure

The present disclosure relates to a protection method in an optical communication system and an optical communication system capable of realizing the protection method.

2. Discussion of the Background Art

With an increasing demand for high-speed access services, fiber to the home (FTTH) has been spread worldwide. A large part of FTTH services are provided by a passive optical network (PON) system which is economically excellent and in which one optical subscriber unit (OSU) accommodates a plurality of optical network units (ONUs) by time division multiplexing (TDM). In upstream communication of TDM-PON, a system bandwidth is shared between ONUs based on dynamic bandwidth allocation calculated in the OSU, and as illustrated in FIG. 1, each ONU 200 transmits signal light intermittently only in an allowed transmission period notified from an OSU 51 to prevent collision of signal lights. Gigabit Ethernet (registered trademark) PON (GE-PON) and Gigabit-capable PON (G-PON) which have a transmission speed of the Gigabit class are presently the main systems; however, there is a demand for a PON system having a larger capacity with the introduction of applications that enables files of large capacity to be uploaded and downloaded as well as the development of video distribution services. However, since the TDM-PON system extends the system bandwidth by increasing a line rate, the reception characteristics deteriorate dramatically due to the influence of the accelerated speed and the wavelength dispersion, and burst transceivers may cause an economic problem and thus, it is difficult to increase the capacity of the PON system exceeding 10 gigabits.

Application of wavelength division multiplexing (WDM) techniques has been considered to realize a large capacity exceeding 10 gigabits. FIG. 2 illustrates an example of a WDM/TDM-PON in which WDM techniques are combined with TDM-PON. A downstream wavelength and an upstream wavelength are fixedly allocated for each ONU 200a depending on a terminal of a wavelength routing unit 152, to which the ONU will be connected via an optical fiber transmission line, and a temporal overlap of signals between all ONUs is allowed up to the number of OSUs. Thus, it is possible to extend the system bandwidth without increasing the line rate per wavelength by adding an additional OSU.

ONUs connected to the same terminals among the terminals of the wavelength routing unit 152 via the optical fiber transmission line are logically connected to the same OSU and share an upstream bandwidth and a downstream bandwidth. Here, the logical connection between ONUs and OSUs is invariable, it is not possible to distribute a traffic load between different OSUs regardless of a traffic load state of each OSU.

In contrast, Non-Patent Literature 1 proposes a wavelength-tunable WDM/TDM-PON in which an optical transmitter and an optical receiver mounted in an ONU have a wavelength tuning function (FIG. 3). In this configuration, a logical connection destination OSU can be changed for respective ONUs by switching the transmission and reception wavelengths in the ONU. By using this function, when an OSU in a heavy load state is present, the logical connection between ONUs and OSUs can be changed so that a traffic load is distributed to an OSU in a light load state to prevent deterioration in the communication quality in the OSU in the heavy load state. Moreover, when the heavy load state of an OSU occurs normally, the WDM/TDM-PON configuration illustrated in FIG. 2 needs to increase the system bandwidth to secure a constant communication quality, but the wavelength-tunable WDM/TDM-PON configuration illustrated in FIG. 3 can secure a constant communication quality by distributing the traffic load between OSUs to effectively utilize the entire system bandwidth, and thus, it is possible to suppress an additional investment in equipment for increasing the system bandwidth.

In the wavelength-tunable WDM/TDM-PON, the logical connection destination OSU can be changed for respective ONUs as described above. Thus, the wavelength-tunable WDM/TDM-PON enables a protection operation in which when an OSU fails, an ONU logically connected to the failed OSU changes a destination OSU to another OSU to resume communication (FIG. 4 and Non-Patent Literature 2).

CITATION LIST

Non Patent Literature

Non-Patent Literature 1: S. Kimura, "WDM/TDM-PON Technologies for Future Flexible Optical Access Networks," 6A1-1, OECC2010, 2010

Non-Patent Literature 2: Tamaki et al., "λ-Tunable WDM/TDM-PON System for Future Optical Access Network," IEICE Technical Report, vol. 112, no. 118, pp 39-44, July, 2012

Non-Patent Literature 3: Sarashina et al., "Study of link-up time in λ-tunable WDM/TDM-PON with wavelength-swept system," Proceedings of the 2013 IEICE General Conference, B-8-35, 2013

Technical Problem

In the wavelength-tunable WDM/TDM-PON configuration illustrated in FIG. 3, when the failure in the OSU is occurred, the reception wavelength of an ONU logically connected to the failed OSU is set to the output wavelength of the failed OSU, and the ONU cannot receive downstream signal light from other OSUs that output downstream signal light using different wavelengths. Thus, the ONU logically connected to the failed OSU cannot receive a wavelength switching instruction from an optical line terminal (OLT). In order to realize the protection operation in this situation, the ONU logically connected to the failed OSU needs to change a destination OSU by switching the transmission and reception wavelengths, but Non-Patent Literature 2 does not describe a method of realizing the same.

An ONU having detected non-reception of a downstream signal light for a certain period or longer removes connection information with an OLT and executes a discovery process again whereby the ONU is registered in the OLT again. In this case, since the ONU logically connected to the failed OSU executes the discovery process again since a failure has occurred in the OSU that outputs a downstream signal light using a wavelength that the ONU can receive. In the discovery process, in order to start a process of registering a non-registered ONU, the reception wavelength of an ONU needs to be identical to the wavelength of a search signal that gives an instruction for transmitting a registration request to a non-registered ONU. Here, as disclosed in Non-Patent Literature 3, by applying a wavelength sweeping system in which a non-registered ONU periodically sweeps a reception wavelength over an entire downstream wavelength band is used, the non-registered ONU can make its reception wavelength identical to the wavelength of a search signal transmitted by at least one of the OSUs that operate normally, and a process of registering the non-registered ONU in the OLT can be started. Thus, since the ONU logically connected to the failed OSU is logically connected to a new OSU through a discovery process which uses the wavelength sweeping system, the protection operation is realized.

Here, from the perspective of the reliability of a communication system, in the protection operation, the period required for an ONU logically connected to a failed OSU to resume communication after the occurrence of a failure in the OSU needs to be as short as possible. However, in the method in which the ONU logically connected to the failed OSU is logically connected to a new OSU through a discovery process which uses the wavelength sweeping system, since the registration process of the non-registered ONU does not start until the reception wavelength of the ONU becomes identical to the wavelength of the search signal, the period required for completing the protection operation becomes longer.

SUMMARY

Therefore, in order to solve the problems, an object of the present disclosure is to provide a protection method and an optical communication system in which the period required for an ONU logically connected to a failed OSU to resume communication is short.

In order to attain the object, according to the present disclosure, a backup OSU is allocated to each ONU so that the connection information held in an ONU and an OLT is continuously held even when a failure in an OSU is detected. In the following description, an OLT is sometimes referred to as a parent node, and an ONU is sometimes referred to as a child node.

Specifically, a protection method according to the present disclosure is a protection method of an optical communication system in which a parent node including a plurality of termination equipments are connected to a plurality of child nodes via optical fiber transmission lines, and each child node is assigned to a termination equipment by using a wavelength tuning function of both the child node and the termination equipment, or either the child node or the termination equipment, the method comprising:
  a backup designating process wherein a termination equipment, which is other than the termination equipment to which the child node is assigned, is designated as a backup termination equipment for each child node;
  an information holding process wherein the child node keeps on holding its own connection information necessary for logically connecting the parent node when the child node detects a failure in a termination equipment and the parent node keeps on holding connection information on each child node which is originally assigned to the failed termination equipment when the parent node detects a failure in a termination equipment;
  a control frame transmitting process wherein the backup termination equipment for the child node which is originally assigned to the failed termination equipment launches a control frame to the child node referring to the connection information on the child node held in the parent node;
  a responding process wherein the child node, which is originally assigned to the failed termination equipment, launches upstream signal as a response to the control frame referring to its own connection information held in the child node; and
  a confirmation process wherein the parent node confirms that the child node has been re-assigned from the failed termination equipment to the backup termination equipment triggered by the reception of the upstream signal launched from the child node in the responding process.

Specifically, an optical communication system according to the present disclosure includes:
  a parent node including a plurality of termination equipments;
  a plurality of child nodes connected to the parent node via optical fiber transmission lines; and
  each child node is assigned to a termination equipment by using a wavelength tuning function of both the child node and the termination equipment, or either the child node or the termination equipment, wherein
  the parent node includes:
  a backup designating unit that designates a termination equipment, which is other than the termination equipment to which the child node is assigned, as a backup termination equipment for each child node;
  a first information holding unit that keeps on holding connection information on each child node which is originally assigned to the failed termination equipment when the parent node detects a failure in a termination equipment;
  a control frame transmitting unit that allows the backup termination equipment for the child node which is originally assigned to the failed termination equipment to transmit a control frame to the child node referring to the connection information on the child node held in the first information holding unit; and
  a confirmation unit that confirms the child node has been re-assigned from the failed termination equipment to the backup termination equipment triggered by the reception of the upstream signal launched from the child node in response to the control frame, and
  the child node includes:
  a second information holding unit that keeps on holding the connection information for logically connection to the parent node when the child node detects a failure in a termination equipment; and
  a responding unit that launches upstream signal in response to the control frame referring to the connection information held by the second information holding unit.

In the present disclosure, when an ONU logically connected to a failed OSU detects a failure in an OSU, since the ONU does not remove the connection information with an OLT and a backup OSU in the OLT takes over the information on the ONU, the discovery operation is not required. Thus, the ONU logically connected to the failed OSU can resume communication in a short period after the occurrence of a failure in the OSU. Accordingly, in the present disclosure, it is possible to provide a protection method and an optical communication system in which the period required for an ONU logically connected to a failed OSU to resume communication is short.

In the protection method according to the present disclosure, the backup termination equipment is notified of the connection information on the child node which are originally assigned to the failed termination equipment in the control frame transmitting process.

The control frame transmitting unit of the optical communication system according to the present disclosure notifies the backup termination equipment of the connection information on the child nodes which are originally assigned to the failed termination equipment.

In the protection method according to the present disclosure, in the backup designating process, the child node is notified of a wavelength on which the backup termination equipment launches downstream signals to the child node, and the method includes a reception wavelength switching process wherein the child node changes the reception wavelength so that the child node can receive downstream signals from the backup termination equipment when the child node detects a failure in the termination equipment to which the child node is assigned.

The backup designating unit of the optical communication system according to the present disclosure notifies the child node of a wavelength on which the backup termination equipment launches downstream signals to the child node, and the wavelength tuning function of the child node changes the reception wavelength of the child node so that the child node can receive downstream signals from the backup termination equipment when the child node detects a failure in the termination equipment to which the child node is assigned.

According to the present disclosure, since the ONU logically connected to the failed OSU can switch the reception wavelength of the downstream signal light to a backup wavelength when a failure in the OSU is detected, it is possible to receive a control frame transmitted by a backup OSU without sweeping the reception wavelength over an entire downstream wavelength band.

The wavelength of an upstream signal light output by the ONU can be set according to the following two methods.

In one of the methods, in the backup designating process, the child node is notified of a wavelength on which the child node launches the upstream signals to the backup termination equipment, and the method includes a transmission wavelength switching process wherein the child node changes the transmission wavelength so that the backup termination equipment can receive upstream signals from the child node when the child node detects a failure in the termination equipment to which the child node is assigned.

The backup designating unit of the optical communication system notifies the child node of a wavelength on which the child node launches the upstream signals to the backup termination equipment, and the wavelength tuning function of the child node changes the transmission wavelength of the child node so that the backup termination equipment can receive upstream signals from the child node when the child node detects a failure in the termination equipment to which the child node is assigned.

The other one of the method includes a transmission wavelength switching process wherein the child node changes the transmission wavelength according to a wavelength switching direction included in the control frame notified in the control frame transmitting process so that the backup termination equipment can receive upstream signals from the child node.

The wavelength tuning function of the child node of the optical communication system changes the transmission wavelength of the child node according to a wavelength switching direction included in the control frame notified by the control frame transmitting unit.

When a reception wavelength of an optical receiver of an ONU is fixed, a protection method and an optical communication system according to the present disclosure have the following configuration.

In the protection method according to the present disclosure, in the optical communication system, a wavelength routing unit is placed between the parent node and the child nodes and a reception wavelength of each child node is fixed in advance, the information holding process involves holding the reception wavelength as one of the connection information on each child node, and the control frame transmitting process involves allowing the backup termination equipment to launch the control frame on the reception wavelength by referring to the connection information on each child node.

The optical communication system according to the present disclosure further includes a wavelength routing unit that is placed between the parent node and the child nodes, wherein a reception wavelength of each child node is fixed in advance, the first information holding unit of the parent node holds the reception wavelength as one of the connection information on each child node, and the control frame transmitting unit of the parent node allows the backup termination equipment to launch the control frame on the reception wavelength by referring to the connection information on each child node.

When a transmission wavelength of an optical transmitter of an ONU is also fixed, a protection method and an optical communication system according to the present disclosure have the following configuration.

In the protection method according to the present disclosure, a transmission wavelength of upstream signals transmitted from the child node is fixed in advance, the information holding process involves holding the transmission wavelength as one of the connection information on each child node, and the confirmation process involves setting a receiver wavelength of the backup termination equipment to the transmission wavelength of upstream signals launched from the child node so that the backup termination equipment can receive upstream signals from the child node.

In the optical communication system according to the present disclosure, a transmission wavelength of upstream signals launched from the child node is fixed in advance, the first information holding unit holds the transmission wavelength as one of the connection information on each child node, and the confirmation unit of the parent node sets a receiver wavelength of the backup termination equipment to the transmission wavelength of upstream signals launched from the child node so that the backup termination equipment can receive upstream signals from the child node.

Advantageous Effects of Disclosure

According to the present disclosure, it is possible to provide a protection method and an optical communication system in which the period required for an ONU logically connected to a failed OSU to resume communication is short.

BRIEF DESCRIPTION OF THE DRAWINGS

FIG. 7 is a diagram for describing input-output characteristics in a downstream of a wavelength routing unit.
FIG. 8 is a diagram for describing input-output characteristics in an upstream of a wavelength routing unit.

DETAILED DESCRIPTION OF THE PREFERRED EMBODIMENT

Figure 1:
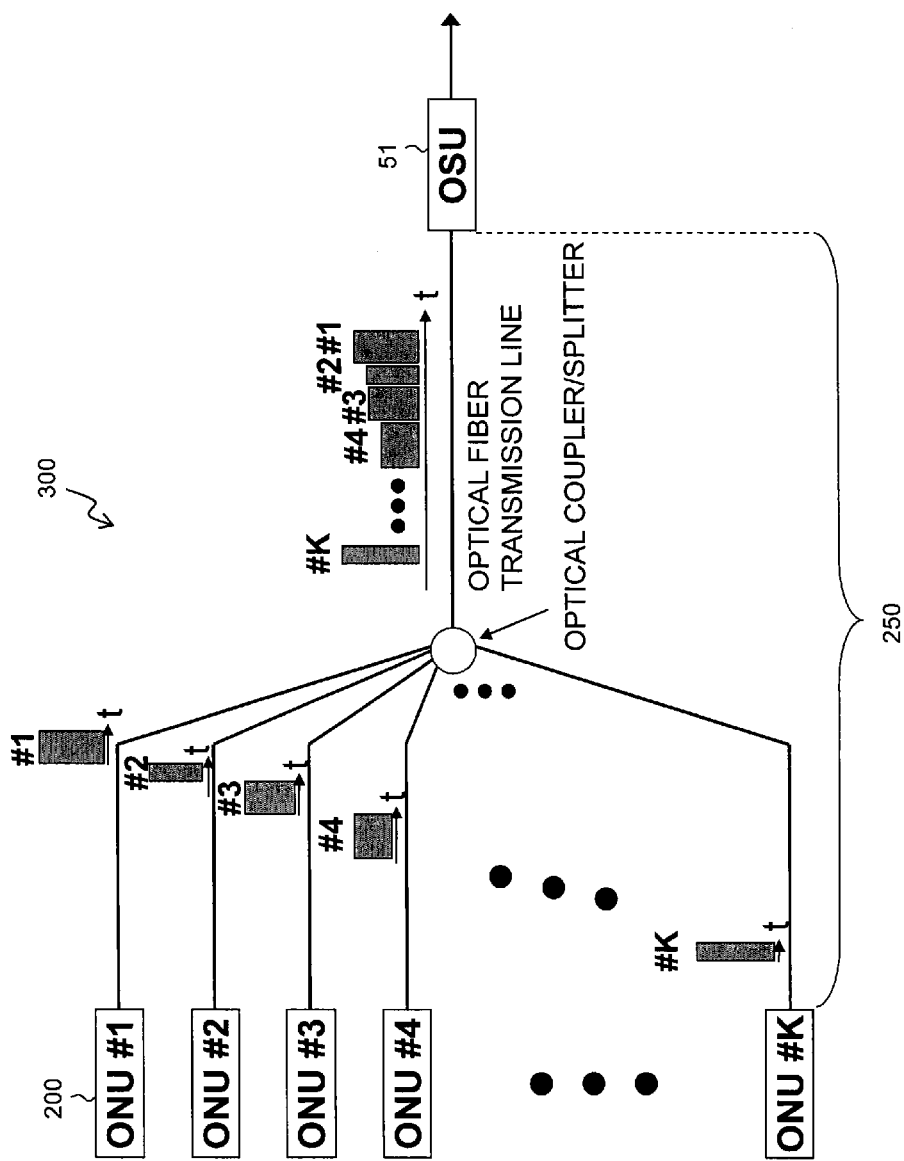
FIG. 1 is a diagram for describing a TDM-PON.
Figure 2:
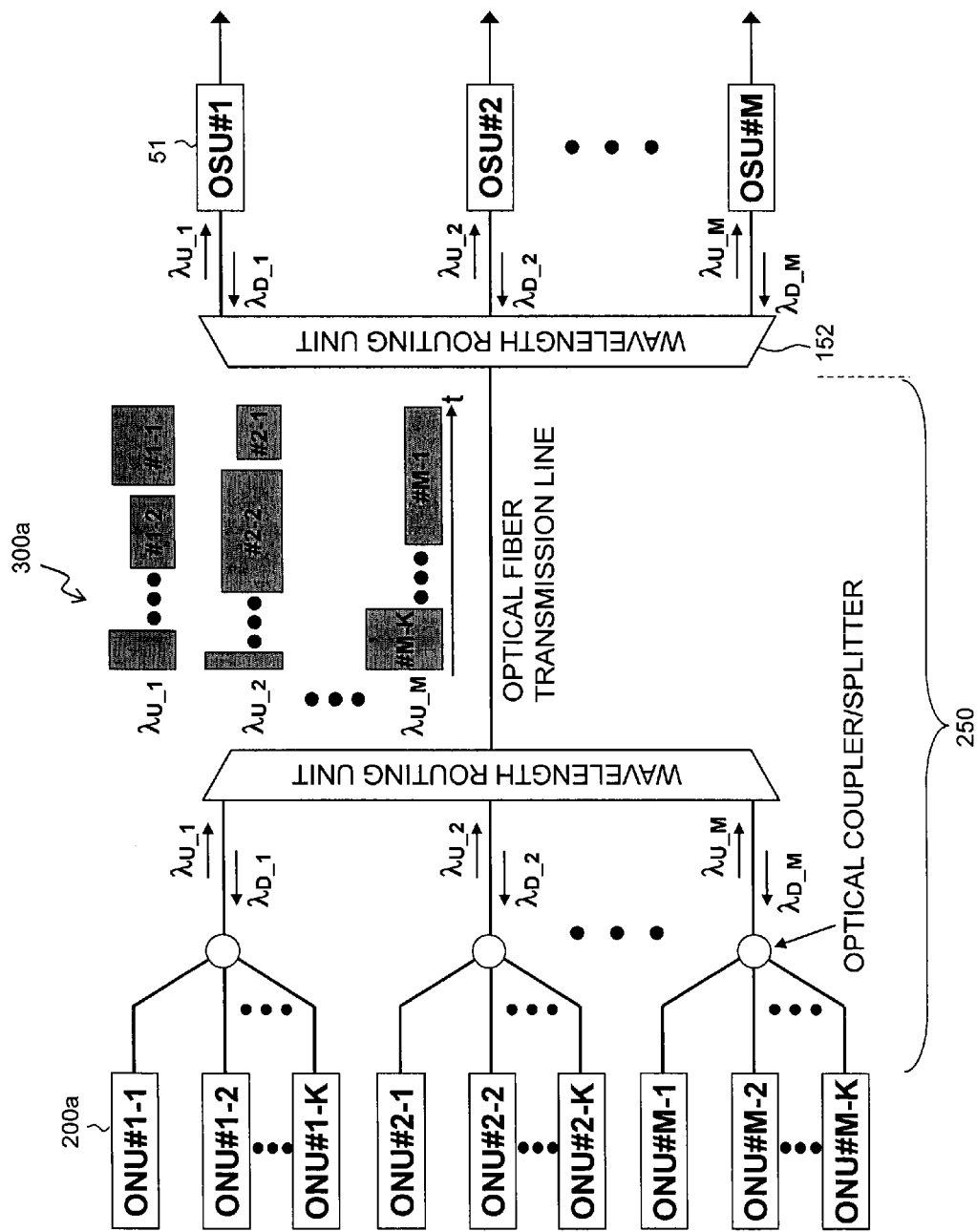
FIG. 2 is a diagram for describing a WDM/TDM-PON.

Hereinafter, an embodiment of the present disclosure will be described with reference to the accompanying drawings. The embodiment described below is an example of the present disclosure, and the present disclosure is not limited to the following embodiment. In the present specification and the drawings, the same reference numerals denote the same components.

Embodiment 1

The present embodiment provides a protection method in a wavelength-tunable WDM/TDM-PON in which an optical receiver mounted on an ONU has a wavelength tuning function. The protection method of the present embodiment operates in the following manner. An ONU switches a reception wavelength to a backup wavelength used for making logical connection to a backup OSU designated in advance for each ONU when a failure in an OSU to which the ONU is logically connected is detected, and does not remove connection information with an OLT. In the OLT, a backup OSU of the ONU logically connected to the failed OSU takes over the information on the ONU when a failure in the OSU is detected. In this way, according to the protection method of the present embodiment, the ONU logically connected to the failed OSU resumes communication in a short period.

That is, a protection method of the present embodiment is a protection method of an optical communication system in which
a parent node including a plurality of termination equipments are connected to a plurality of child nodes via optical fiber transmission lines, and each child node is assigned to a termination equipment by using a wavelength tuning function of both the child node and the termination equipment, or either the child node or the termination equipment, the method comprising:
a backup designating process wherein a termination equipment, which is other than the termination equipment to which the child node is assigned, is designated as a backup termination equipment for each child node;
an information holding process wherein the child node keeps on holding its own connection information necessary for logically connecting the parent node when the child node detects a failure in a termination equipment and the parent node keeps on holding connection information on each child node which is originally assigned to the failed termination equipment when the parent node detects a failure in a termination equipment;
a control frame transmitting process wherein the backup termination equipment for the child node which is originally assigned to the failed termination equipment launches a control frame to the child node referring to the connection information on the child node held in the parent node;
a responding process wherein the child node, which is originally assigned to the failed termination equipment, launches upstream signal as a response to the control frame referring to its own connection information held in the child node; and
a confirmation process wherein the parent node confirms that the child node has been re-assigned from the failed termination equipment to the backup termination equipment triggered by the reception of the upstream signal launched from the child node in the responding process.

In the protection method of the present embodiment, in the backup designating process, the child node is notified of a wavelength on which the backup termination equipment launches downstream signals to the child node, and
the method includes a reception wavelength switching process wherein the child node changes the reception wavelength so that the child node can receive downstream signals from the backup termination equipment when the child node detects a failure in the termination equipment to which the child node is assigned.

An optical communication system to which the protection method of the present embodiment is applied includes:
a parent node including a plurality of termination equipments;
a plurality of child nodes connected to the parent node via optical fiber transmission lines; and
each child node is assigned to a termination equipment by using a wavelength tuning function of both the child node and the termination equipment, or either the child node or the termination equipment,
wherein
the parent node includes:
a backup designating unit that designates a termination equipment, which is other than the termination equipment to which the child node is assigned, as a backup termination equipment for each child node;
a first information holding unit that keeps on holding connection information on each child node which is originally assigned to the failed termination equipment when the parent node detects a failure in a termination equipment;

a control frame transmitting unit that allows the backup termination equipment for the child node which is originally assigned to the failed termination equipment to transmit a control frame to the child node referring to the connection information on the child node held in the first information holding unit; and a confirmation unit that confirms the child node has been re-assigned from the failed termination equipment to the backup termination equipment triggered by the reception of the upstream signal launched from the child node in response to the control frame, and the child node includes:

a second information holding unit that keeps on holding the connection information for logically connection to the parent node when the child node detects a failure in a termination equipment; and a responding unit that launches upstream signal in response to the control frame referring to the connection information held by the second information holding unit.

In the optical communication system, the backup designating unit notifies the child node of a wavelength on which the backup termination equipment launches downstream signals to the child node, and the wavelength tuning function of the child node changes the reception wavelength of the child node so that the child node can receive downstream signals from the backup termination equipment when the child node detects a failure in the termination equipment to which the child node is assigned.

Figure 3:
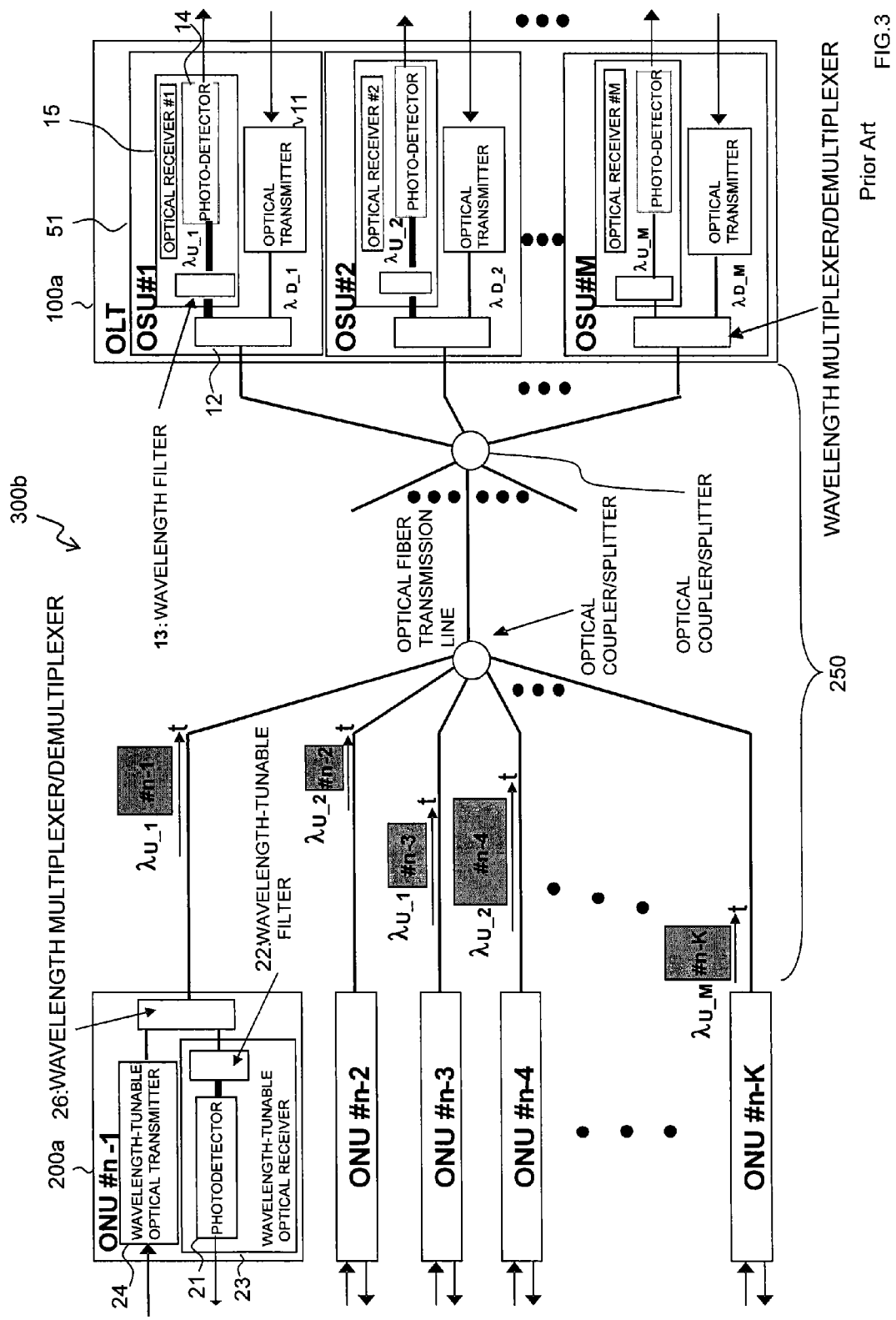
FIG. 3 is a diagram for describing a wavelength-tunable WDM/TDM-PON.
Figure 4:
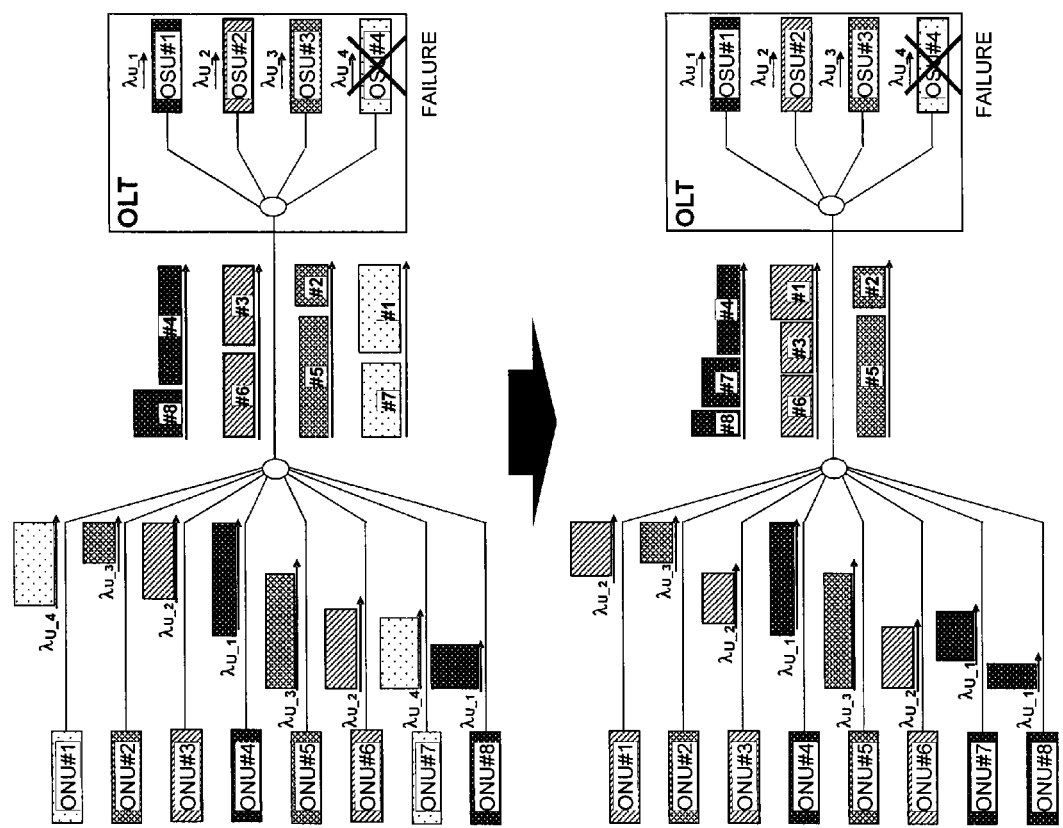
FIG. 4 is a diagram for describing an operation of the wavelength-tunable WDM/TDM-PON.
Figure 5:
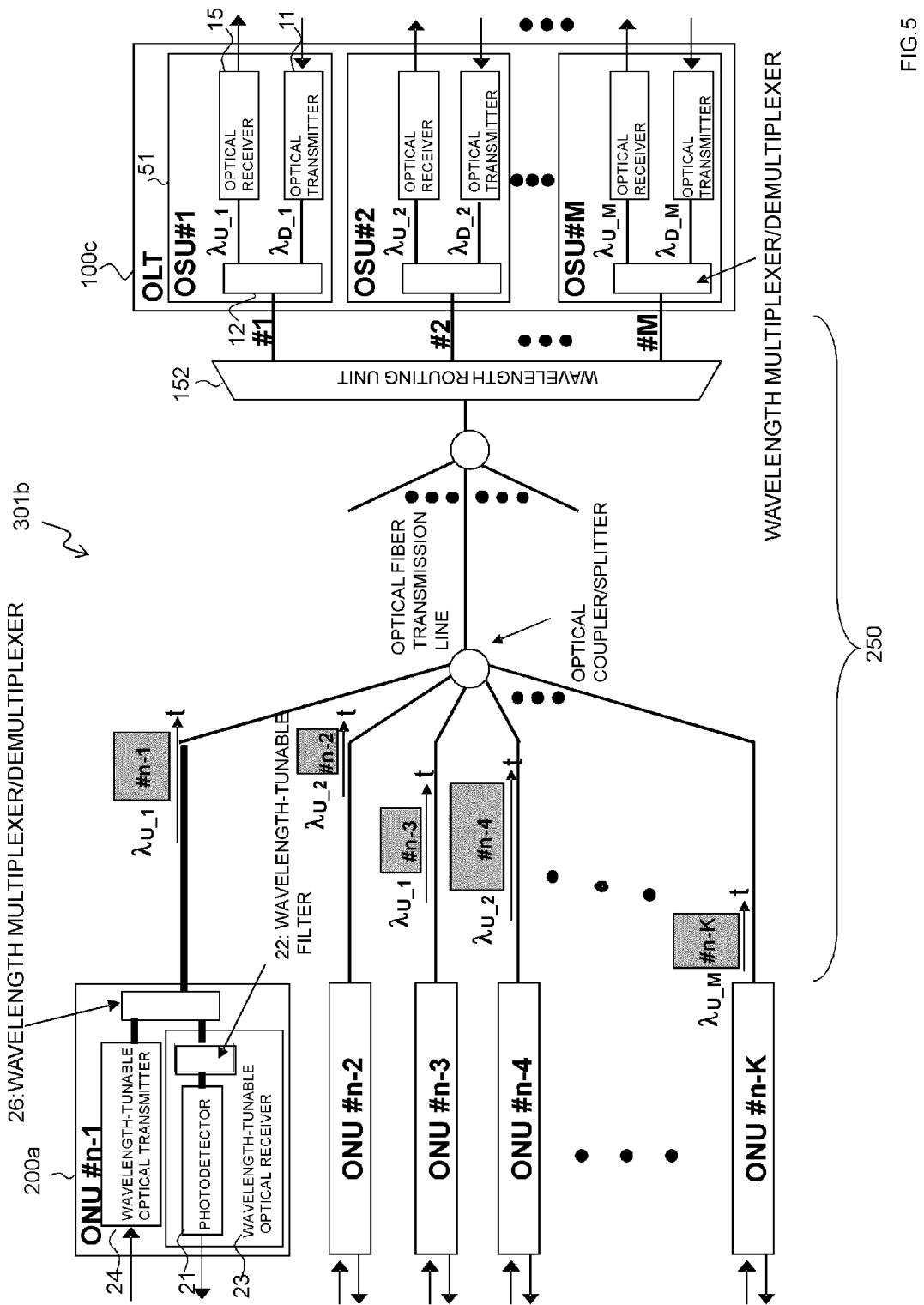
FIG. 5 is a diagram for describing an optical communication system according to the present disclosure.
Figure 6:
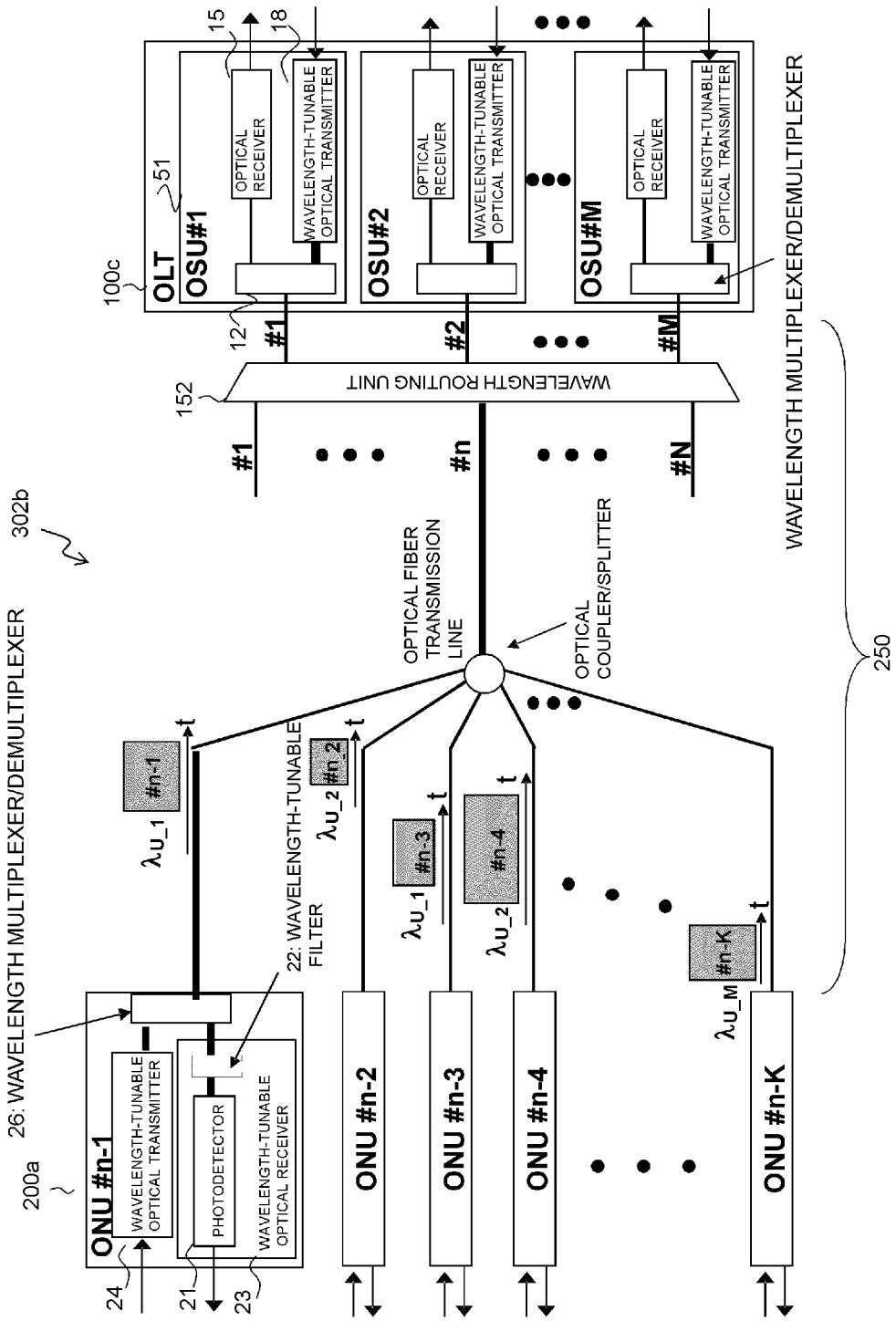
FIG. 6 is a diagram for describing an optical communication system according to the present disclosure.

Specifically, the optical communication system has a wavelength-tunable WDM/TDM-PON configuration illustrated in FIG. 3. The wavelength-tunable WDM/TDM-PON configuration to which the protection method of the present embodiment is applied is not limited to the configuration illustrated in FIG. 3 but can be applied to a configuration (FIG. 5) in which a wavelength routing unit such as an AWG or a thin film filter and an optical coupler/splitter such as an optical coupler formed of an optical fiber, a PLC, or the like are disposed between an ONU and an OLT, for example. The wavelength-tunable WDM/TDM-PON configuration can be also applied to such a configuration as illustrated in FIG. 6 in which a wavelength routing unit that includes OSU-side ports #1 to #M (M is an integer of 2 or more) and optical fiber transmission line-side ports #1 to #N (N is an integer of 2 or more) and has a wavelength distribution function of outputting input light from one port determined according to a wavelength is disposed between the ONU and the OLT. An example of the wavelength routing unit is an N×M AWG which has a wavelength routing function and of which the input-output characteristics are expressed as illustrated in FIGS. 7 and 8.

In a wavelength-tunable WDM/TDM-PON 300$b$ illustrated in FIG. 3, an OLT 100$a$ which includes OSUs 51 #1 to #M, outputs downstream signal light having wavelengths of $\lambda_{D\_1}$ to $\lambda_{D\_M}$, and receives upstream burst signal light having wavelengths of $\lambda_{U\_1}$ to $\lambda_{U\_M}$ and a plurality of ONUs 200$a$ in which wavelengths each from $\lambda_{D\_1}$ to $\lambda_{D\_M}$ and $\lambda_{U\_1}$ to $\lambda_{D\_M}$ are allocated from the OLT as the downstream wavelength and the upstream wavelength, respectively, are connected via an optical fiber transmission line. Each OSU 51 in the OLT 100$a$ transmits downstream signal light having wavelengths different for respective OSUs. The downstream signal light from each OSU 51 is wavelength-multiplexed by an optical coupler/splitter 151 and is then output to the optical fiber transmission line. An example of the optical coupler/splitter 151 is an optical coupler formed of an optical fiber or a planar lightwave circuit (PLC).

A wavelength-tunable optical receiver 23 in the ONU 200$a$ selectively receives downstream signal light having the downstream wavelength allocated from the OLT 100$a$ among the input wavelength-multiplexed signal light components. A photodetector 21 is a photodiode (PIN-PD) or an avalanche photodiode (APD), for example. As illustrated in FIG. 3, the ONU 200$a$ has a wavelength-tunable filter 22 disposed in front of the photodetector 21. The ONU 200$a$ changes the transmission wavelength of the wavelength-tunable filter 22 according to the allocated downstream wavelength and thus can selectively receive downstream signal light of a desired wavelength with the aid of a wavelength-tunable optical receiver 23. Each ONU 200$a$ selects a reception frame by determining whether the received frame is addressed thereto using an ONU identifier such as a logical link ID (LLID).

On the other hand, the ONU 200$a$ includes a wavelength-tunable optical transmitter 24 capable of intermittently transmitting signal light having wavelengths of $\lambda_{U\_1}$ to $\lambda_{U\_M}$ for upstream communication. The ONU 200$a$ transmits upstream burst signal light using the upstream wavelength allocated from the OLT 100$a$ in an allowed transmission period notified from the OLT. The allowed transmission period notified from the OLT as dynamic bandwidth allocation information is determined by taking a frame round-trip time (RTT) between the ONUs 200$a$ stored in the OLT 100$a$ into consideration so that burst signal light components from different ONUs 200$a$ to which the same upstream wavelength is allocated do not collide with each other. The wavelength-tunable optical transmitter may be configured such that an output wavelength of a direct modulation laser such as a distributed feedback (DFB) laser is changed according to temperature control and may be configured such that direct modulation lasers having different output wavelengths are arranged in an array form and a laser that emits light is switched at a high speed according to a control signal supplied from the outside. The wavelength-tunable optical transmitter may be configured such that output light from a wavelength-tunable light source is externally modulated using a Mach-Zehnder modulator formed of semiconductors or lithium niobate (LiNbO$_3$), an electroabsorption (EA) modulator, a semiconductor optical amplifier (SOA) modulator, and the like. A wavelength-tunable light source may be configured such that continuous wave (CW) lasers having different output wavelengths are arranged in an array form and the output wavelength is switched according to a control signal supplied from the outside. Moreover, a distributed Bragg reflector (DBR) laser, an external resonator-type laser, and the like may be used as the wavelength-tunable light source.

The upstream burst signal light transmitted through the optical fiber transmission line is branched by the optical coupler/splitter 151 and the branched light components are input to the OSUs 51 #1 to #M that selectively receive upstream burst signal light of different wavelengths respectively. As illustrated in FIG. 3, since wavelength filters 13 of which the transmission wavelength is different for respective optical receivers are disposed in front of the photodetector 14 such as a PIN-PD or an APD for burst signals, the OSUs 51 can selectively receive upstream burst signal light of different wavelengths. Here, when each ONU 51 transmits upstream burst signal light by inserting an ONU identifier such as an LLID assigned thereto in a transmission frame, the OLT 100*a* can specify the ONU 200*a* which is the transmitter of the frame by the ONU identifier in the received frame.

Figure 9:
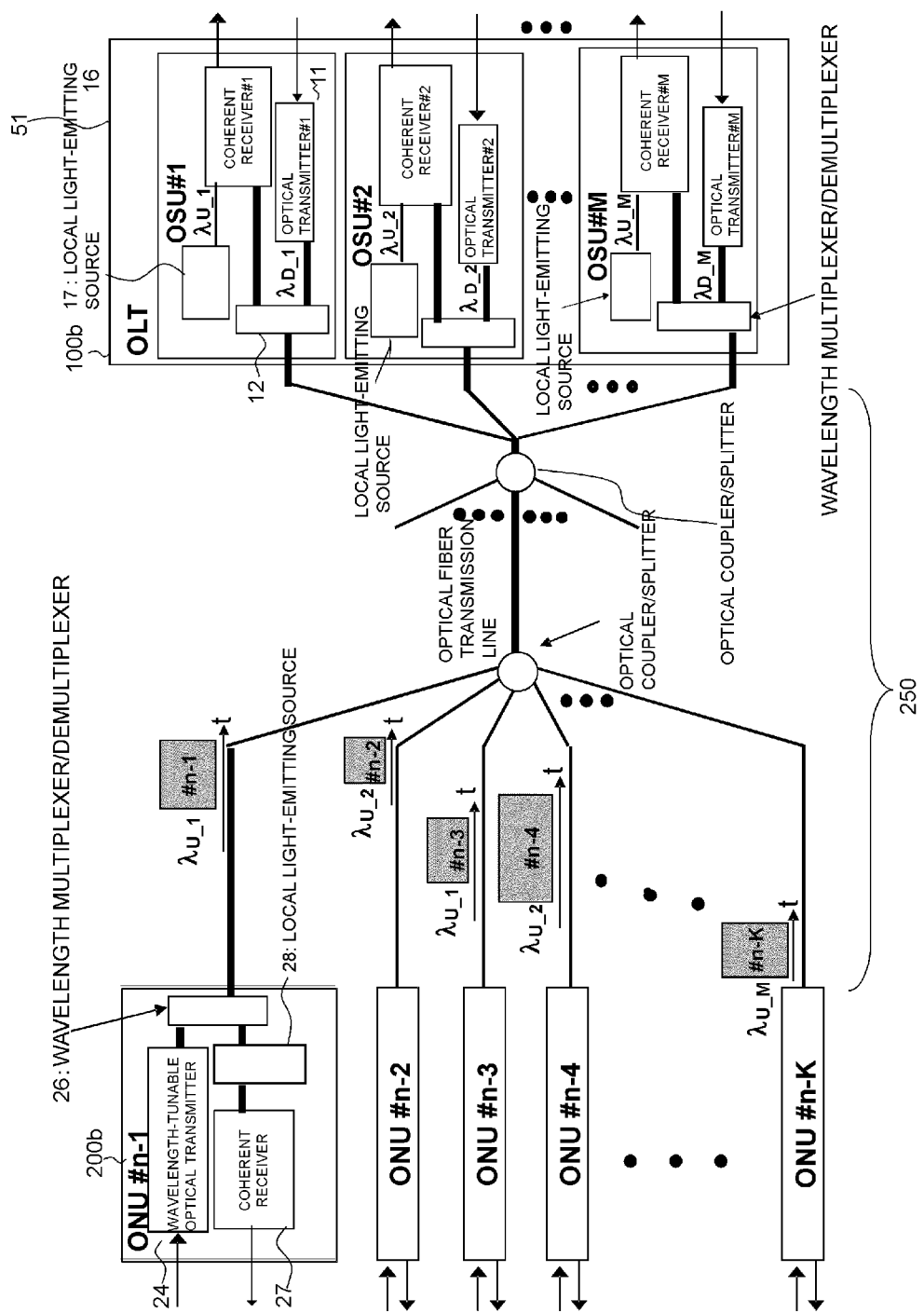
FIG. 9 is a diagram for describing an optical communication system according to the present disclosure.

A coherent receiver (16, 27) as illustrated in FIG. 9 may be used as an optical receiver in the ONU and the OLT. In this case, an output wavelength of a local light-emitting source 28 in the ONU 200*b* is set to be near the wavelength of the downstream signal light allocated thereto. On the other hand, the output wavelength of a local light-emitting source 17 in the OLT 100*b* is set to be near the wavelength of any one of $\lambda_{U\_1}$ to $\lambda_{U\_M}$ so that the wavelength is different for the respective OSUs 51. By using coherent receivers which provide high reception sensitivity, the loss allowed in an optical fiber transmission line and the loss allowed in the optical coupler/splitter 151 connected to each OSU can be increased. By increasing the transmission loss and the branch loss allowed in the optical fiber transmission line, it is possible to increase the transmission distance as well as the number of accommodated ONUs. Moreover, since the number of OSUs can be increased by increasing the branch loss allowed in the optical coupler/splitter 151 connected to each OSU, it is possible to extend the entire system bandwidth. Further, since wavelength filters are not required by applying coherent receivers, it is possible to decrease the interval between adjacent wavelengths without being limited by the characteristics of wavelength filters.

Figure 10:
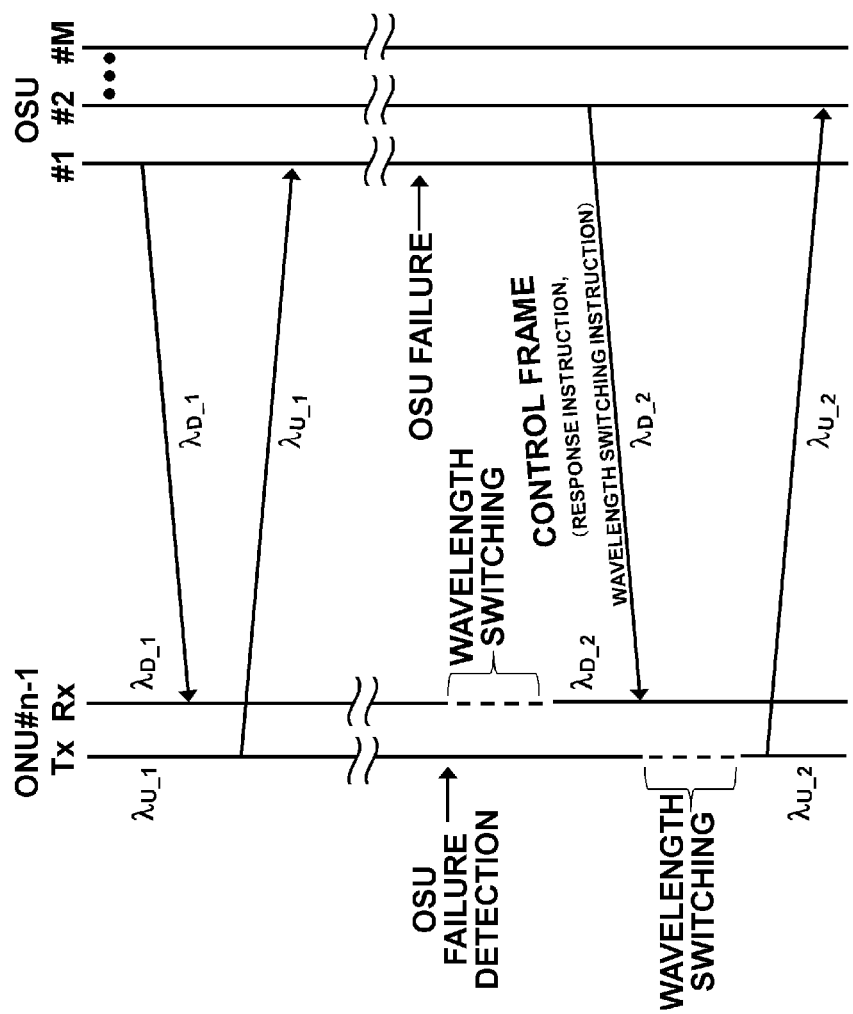
FIG. 10 is a diagram for describing a protection method according to the present disclosure.
Figure 11:
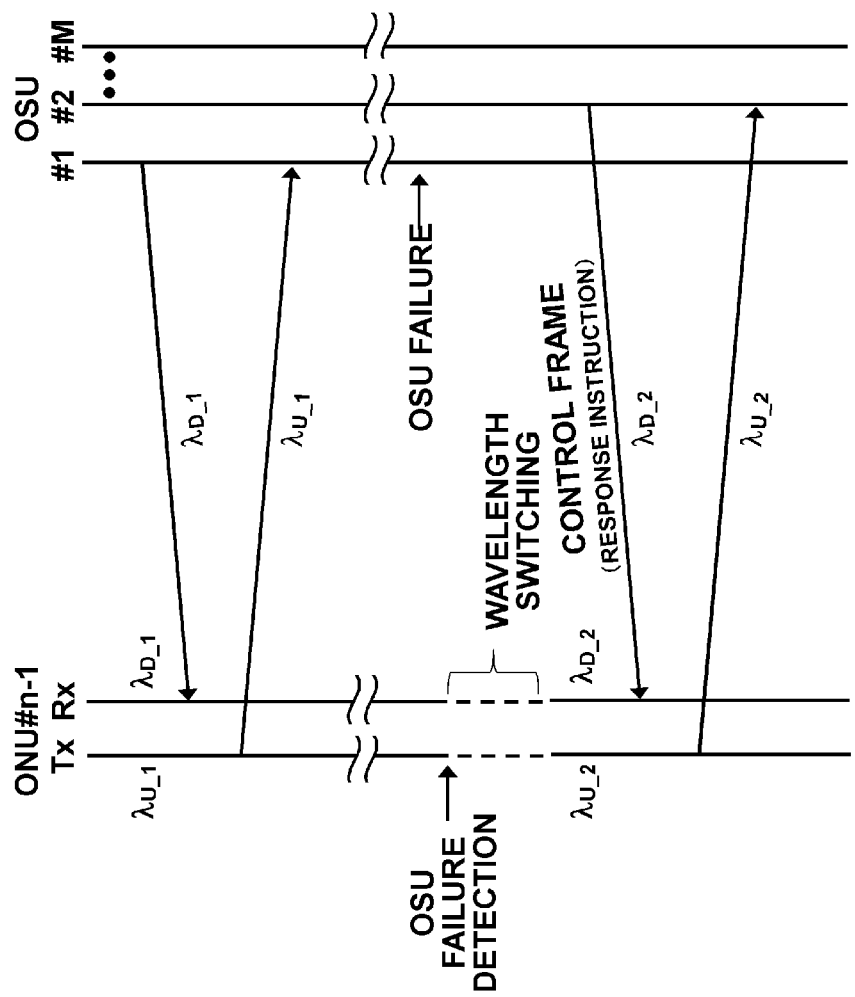
FIG. 11 is a diagram for describing a protection method according to the present disclosure.

Next, a protection operation of the present embodiment will be described. FIGS. 10 and 11 illustrate a case in which an ONU #n−1 logically connected to a failed OSU #1 changes a destination of logically connected OSU to an OSU #2 that is designated as a backup OSU.

[Backup Designating Process, Backup Designating Unit]

In the wavelength-tunable WDM/TDM-PON configuration to which the present embodiment is applied, another backup OSU other than an OSU to which an ONU is logically connected is designated for each ONU. The backup OSU designated for each ONU may be an OSU to which one or more ONUs are logically connected and may be an OSU to which an ONU is not logically connected. In this case, a downstream wavelength used for making logical connection to the backup OSU is notified to each ONU as a backup wavelength. Moreover, an upstream wavelength used for making logical connection to the backup OSU may also be notified to each ONU as a backup wavelength (FIG. 11). Further, after an ONU changes a downstream reception wavelength, the upstream wavelength may be notified from the backup OSU to the ONU (FIG. 10). The OLT in FIGS. 3, 5, 6, and 9 has a backup designating unit.

[Reception Wavelength Switching Process, Transmission Wavelength Switching Process, Wavelength-Tuning Function]

When an ONU has detected non-reception of downstream signal light for a certain period or longer, the ONU determines that a failure has occurred in an OSU and autonomously switches the reception wavelength or the transmission and reception wavelengths to the notified backup wavelength. When the downstream wavelength only is notified as the backup wavelength, the ONU switches the reception wavelength only as illustrated in FIG. 10. When upstream and downstream wavelengths are notified as the backup wavelength, the ONU switches the reception wavelength and the transmission wavelength as illustrated in FIG. 11.

When the downstream wavelength only is notified to each ONU as the backup wavelength, as illustrated in FIG. 10, a wavelength switching instruction to switch the transmission wavelength to the upstream wavelength used for making logical connection to the backup OSU is included in a control frame described later. The ONU switches the transmission wavelength to the backup OSU after receiving the control frame. As described above, the ONU has the wavelength tuning function of the present embodiment.

[Information Holding Process, First Information Holding Unit, Second Information Holding Unit]

In this case, the ONU does not remove the connection information with the OLT but continuously stores the ONU identifier such as the LLID allocated from the OLT. That is, the ONU in FIGS. 3, 5, 6, and 9 has a second information holding unit.

The OLT can detect a failure in the OSU based on non-reception of upstream burst signal light for a certain period or longer, for example. The OLT continuously holds the information on the ONU logically connected to the failed OSU when a failure in the OSU is detected. That is, the OLT in FIGS. 3, 5, 6, and 9 has a first information holding unit. Moreover, the OLT delivers the ONU information held therein to the backup OSU. That is, the backup OSU of the ONU logically connected to the failed OSU takes over the ONU information. Examples of the ONU information include an ONU identifier such as an LLID and the like allocated from the OLT and a frame round-trip time between an ONU and an OLT.

[Control Frame Transmitting Process, Control Frame Transmitting Unit]

When a failure in the OSU is detected, the OLT transmits a control frame to ONUs logically connected to the failed OSU to instruct the backup OSU designated to each ONU to send a response. That is, the OLT in FIGS. 3, 5, 6, and 9 has a control frame transmitting unit. The backup OSU inserts an ONU identifier such as the LLID allocated in advance to the ONU which is a destination in a control frame addressed to the ONU logically connected to the failed OSU by referring to the ONU information that was taken over. Moreover, an allowed transmission period of the upstream burst signal light that the ONU transmits as a response may also be included in the control frame. The allowed transmission period is determined by taking a frame round-trip time between the OLT and the ONU into consideration so that the upstream burst signal light components transmitted by each ONU do not collide with each other.

A case in which, at the time at which an OSU failure is detected, one or more ONUs are originally logically connected to a backup OSU set in advance to the ONU logically connected to the failed OSU will be considered. The backup OSU may transmit the control frame addressed to the ONU logically connected to the failed OSU in the same bandwidth allocation cycle as a control frame used for notifying an allowed upstream transmission period to the ONU to which the backup OSU is logically connected and may transmit the same in a time period in which only the control frame addressed to the ONU logically connected to the failed OSU is transmitted.

As illustrated in FIGS. 10 and 11, the ONU switches the reception wavelength to the notified backup wavelength at the time at which the backup OSU of the ONU logically connected to the failed OSU transmits the control frame addressed to the ONU. Thus, the reception wavelength of the ONU is identical to the wavelength of the control frame transmitted by the backup OSU, and the ONU can receive the control frame without sweeping the reception wavelength over the entire downstream wavelength band.

[Responding Process, Responding Unit]

The ONU recognizes that a control frame is addressed thereto based on the ONU identifier such as the LLID allocated from the OLT, continuously stored therein and transmits upstream burst signal light as a response in the allowed transmission period notified in the control frame. That is, the ONU in FIGS. 3, 5, 6, and 9 has a responding unit.

[Confirmation Process, Confirmation Unit]

The OLT confirms whether the destination OSU of the ONU is changed and the protection operation is completed by receiving the upstream burst signal light. That is, the ONU in FIGS. 3, 5, 6, and 9 has a confirmation unit.

Advantageous Effects of Embodiment 1

In the protection method of the present embodiment, the ONU logically connected to the failed OSU switches the reception wavelength to the backup wavelength at the time at which an OSU failure is detected. Thus, the ONU can receive a control frame transmitted by the backup OSU without sweeping the reception wavelength over the entire downstream wavelength band. Moreover, since the ONU does not remove the connection information with the OLT after the reception wavelength is switched to the backup wavelength, and the backup OSU in the OLT takes over the information on the ONU, the discovery operation is not required. Thus, the ONU logically connected to the failed OSU can resume communication in a short period after a failure occurs in the OSU.

Embodiment 2

The present embodiment provides a protection method in a wavelength-tunable WDM/TDM-PON in which an optical receiver mounted on an ONU does not have a wavelength tuning function. The protection method of the present embodiment operates in the following manner. An ONU does not remove connection information with an OLT when a failure in an OSU to which the ONU is logically connected is detected. In the OLT, when an OSU failure is detected, a backup OSU designated for each ONU logically connected to the failed OSU takes over the information on the ONU. In this way, according to the protection method of the present embodiment, the ONU logically connected to the failed OSU resumes communication in a short period.

That is, the protection method of the present embodiment performs the backup designating process, the information holding process, the control frame transmitting process, the responding process, and the confirmation process described in Embodiment 1. Moreover, in the optical communication system to which the protection method of the present embodiment is applied, the parent node (OLT) includes the backup designating unit, the first information holding unit, the control frame transmitting unit, and the confirmation unit, and the child node (ONU) includes the second information holding unit and the responding unit.

Figure 12:
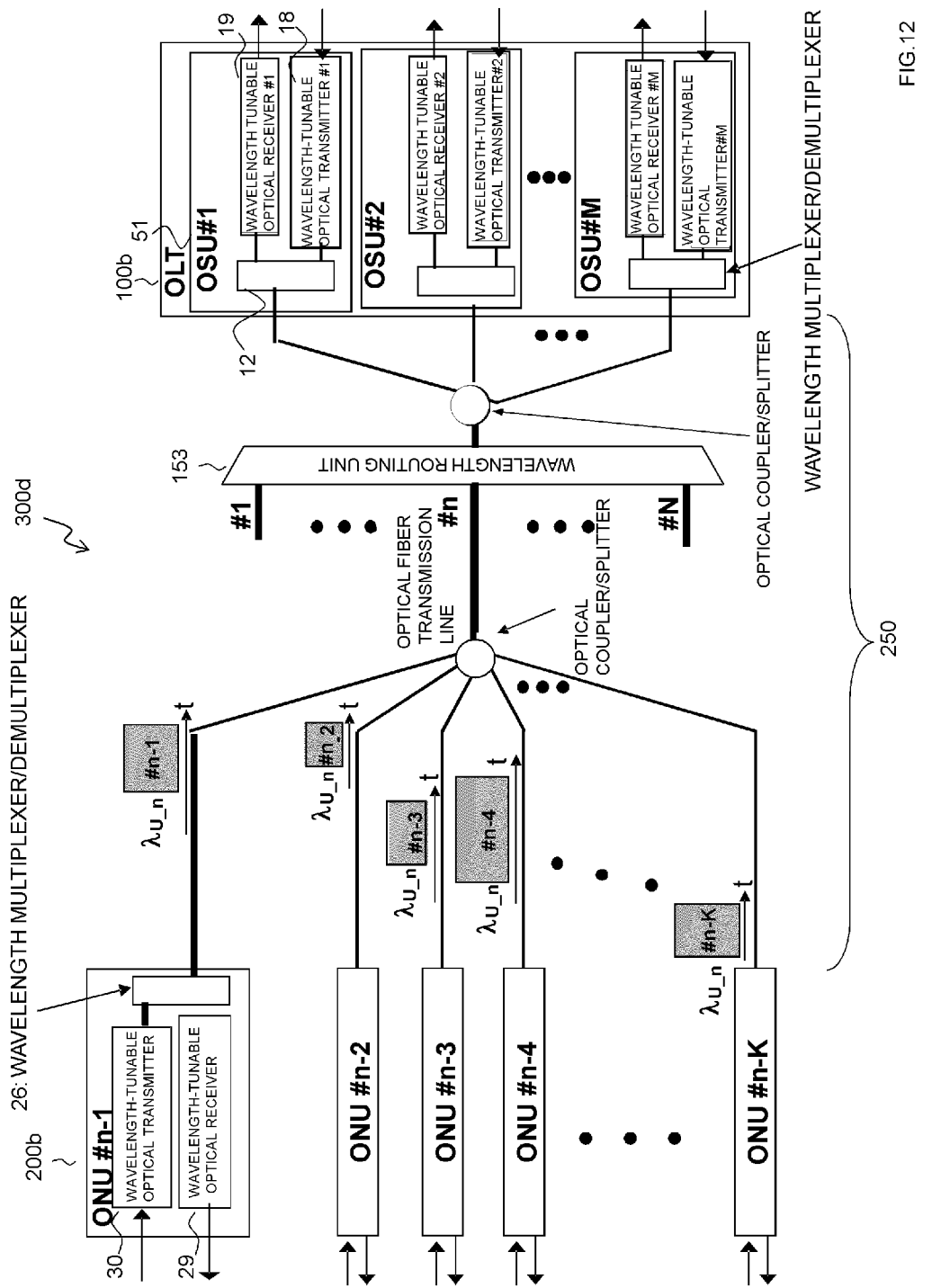
FIG. 12 is a diagram for describing an optical communication system according to the present disclosure.
Figure 13:
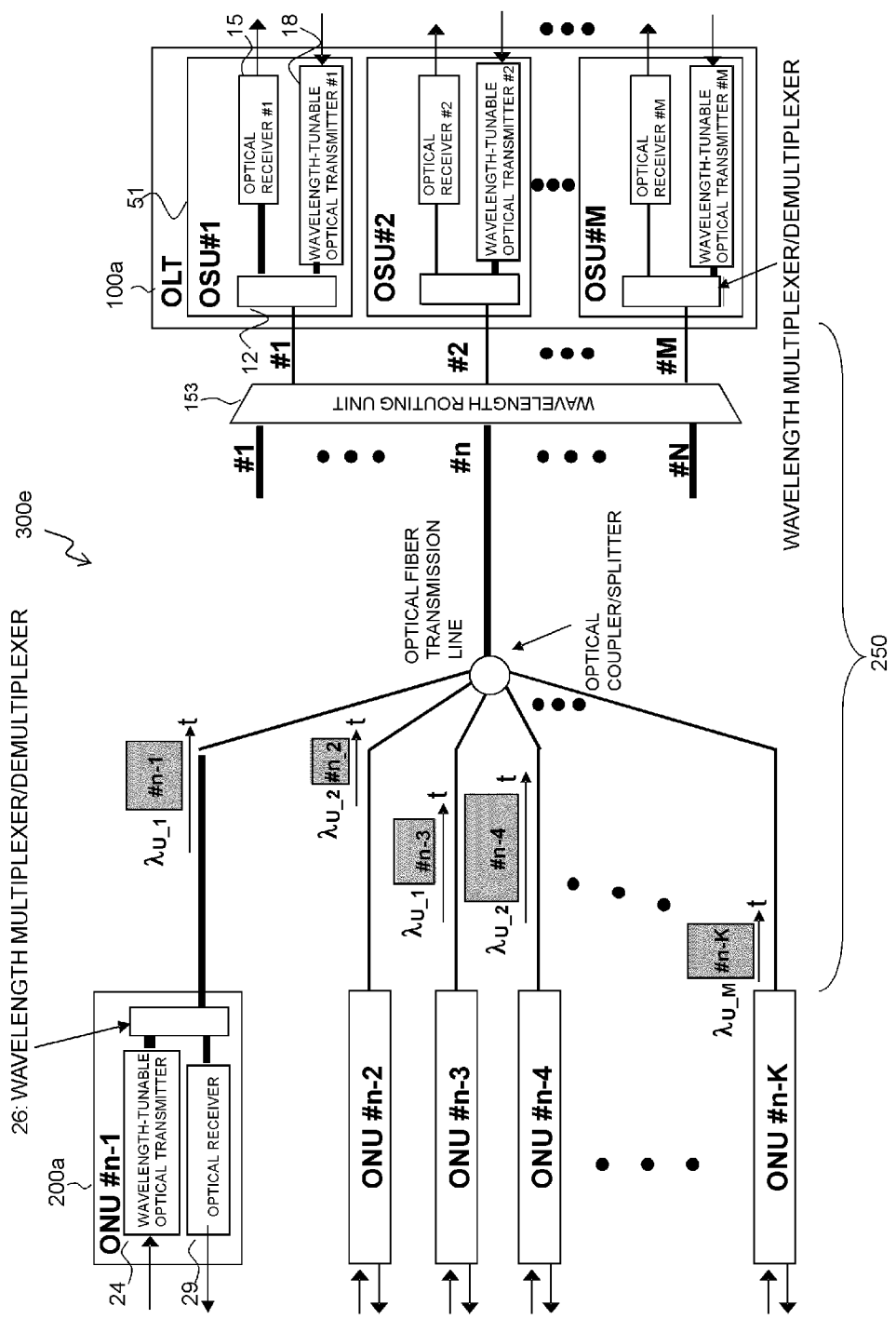
FIG. 13 is a diagram for describing an optical communication system according to the present disclosure.

Specifically, the optical communication system has a wavelength-tunable WDM/TDM-PON configuration illustrated in FIG. 12. In this configuration, a wavelength routing unit 153 such as an AWG or a thin film filter and an optical coupler/splitter 151 such as an optical coupler formed of an optical fiber, a PLC, or the like are disposed between an ONU 200*b* and an OLT 100*b*. The wavelength-tunable WDM/TDM-PON configuration to which the protection method of the present embodiment is applied is not limited to the configuration illustrated in FIG. 12. The protection method of the present embodiment can be applied to such a configuration as illustrated in FIG. 13. FIG. 13 illustrates a configuration in which a wavelength routing unit that includes OSU-side ports #1 to #M (M is an integer of 2 or more) and optical fiber transmission line-side ports #1 to #N (N is an integer of 2 or more) and has a wavelength distribution function of outputting input light from one port determined according to a wavelength is disposed between the ONU and the OLT.

In a wavelength-tunable WDM/TDM-PON 300*d* illustrated in FIG. 12, each OSU 51 includes a wavelength-tunable optical transmitter 18 capable of outputting wavelengths $\lambda_{D\_1}$ to $\lambda_{D\_N}$ for downstream communication. The wavelength-tunable optical transmitter 18 changes the output wavelength for respective frames depending on whether an ONU which is a destination of an input downstream frame will connect to an optical fiber transmission line-side port of the wavelength routing unit 153 via the optical fiber transmission line. The downstream signal light from each wavelength-tunable optical transmitter 18 is multiplexed by the optical coupler/splitter 151 and is then input to the wavelength routing unit 153. The wavelength routing unit 153 outputs the input downstream signal light to an optical fiber transmission line from different optical fiber transmission line-side ports according to the wavelength.

The ONU 200*b* is connected to one of the optical fiber transmission line-side ports of the wavelength routing unit 153 via the optical fiber transmission line and receives downstream signal light output from the connected port using an optical receiver 29. Examples of the optical receiver 29 include a PIN-PD, an APD, and the like. Each ONU 200*b* selects a reception frame by determining whether the received frame is addressed thereto using an ONU identifier such as a LLID.

On the other hand, the ONU 200*b* includes an optical transmitter 30 that can output at least one of the wavelengths $\lambda_{U\_1}$ to $\lambda_{U\_N}$ for upstream communication. The ONU 200*b* transmits upstream burst signal light in an allowed transmission period notified from the OLT using an upstream wavelength allocated from the OLT 100*b*. The allowed transmission period notified from the OLT as dynamic bandwidth allocation information is determined by taking a frame round-trip time between the OLT and each ONU into consideration so that upstream burst signal light components addressed to the same OSU do not collide with each other. The upstream wavelength allocated from the OLT in the configuration of FIG. 12 is determined based on an optical fiber transmission line-side port of the wavelength routing unit 153 to which the ONU is connected via the optical fiber transmission line. However, when the optical transmitter 30 has a wavelength tuning function, it is possible to unify the types of ONUs connected to different optical fiber transmission line-side ports and to improve economic and maintenance performance. As the optical transmitter 30 having the wavelength tuning function, the wavelength-tunable optical transmitter 24 mounted in the ONU of the wavelength-tunable WDM/TDM-PON illustrated in FIG. 3 can be used.

The upstream signal light transmitted through the optical fiber transmission line is wavelength-multiplexed through the wavelength routing unit 153 and is then branched by the optical coupler/splitter 151 and the branched light components are input to the OSUs 51 #1 to #M. The wavelength-tunable optical receiver 19 in each OSU selectively receives upstream burst signal light of a desired upstream wavelength among the input wavelength-multiplexed signal light components in the following manner. First, the wavelength-tunable optical receiver 19 recognizes an ONU which is the transmitter of the input upstream burst signal light by referring to the dynamic bandwidth allocation information notified to each ONU. Moreover, the wavelength-tunable optical receiver 19 sets the reception wavelength depending on an optical fiber transmission line-side port of the wavelength routing unit 153 to which the ONU is connected via the optical fiber transmission line. The wavelength-tunable optical receiver 19 may have a configuration in which a wavelength-tunable filter capable of changing the transmission wavelength is disposed in front of a photodetector such as a PIN-PD or an APD. Here, when each ONU 200b transmits upstream burst signal light by inserting an ONU identifier such as an LLID assigned thereto in a transmission frame, the OLT 100b can specify the ONU which is the transmitter of the frame by the ONU identifier in the received frame.

A coherent receiver may be used as an optical receiver in the ONU and the OSU. In this case, the output wavelength of the local light-emitting source in the ONU is set to be near a predetermined downstream wavelength depending on an optical fiber transmission line-side port of the wavelength routing unit to which the ONU is connected via the optical fiber transmission line. On the other hand, the output wavelength of the local light-emitting source in the OSU is changed depending on an ONU from which the upstream burst signal light input to the optical receiver is transmitted. By using coherent receivers which provide high reception sensitivity, the loss allowed in an optical fiber transmission line and the loss allowed in the optical coupler/splitter connected to each OSU can be increased. By increasing the transmission loss and the branch loss allowed in the optical fiber transmission line, it is possible to increase the transmission distance and the number of accommodated ONUs. Moreover, since the number of OSUs can be increased by increasing the branch loss allowed in the optical coupler/splitter connected to each OSU, it is possible to extend the entire system bandwidth.

Figure 14:
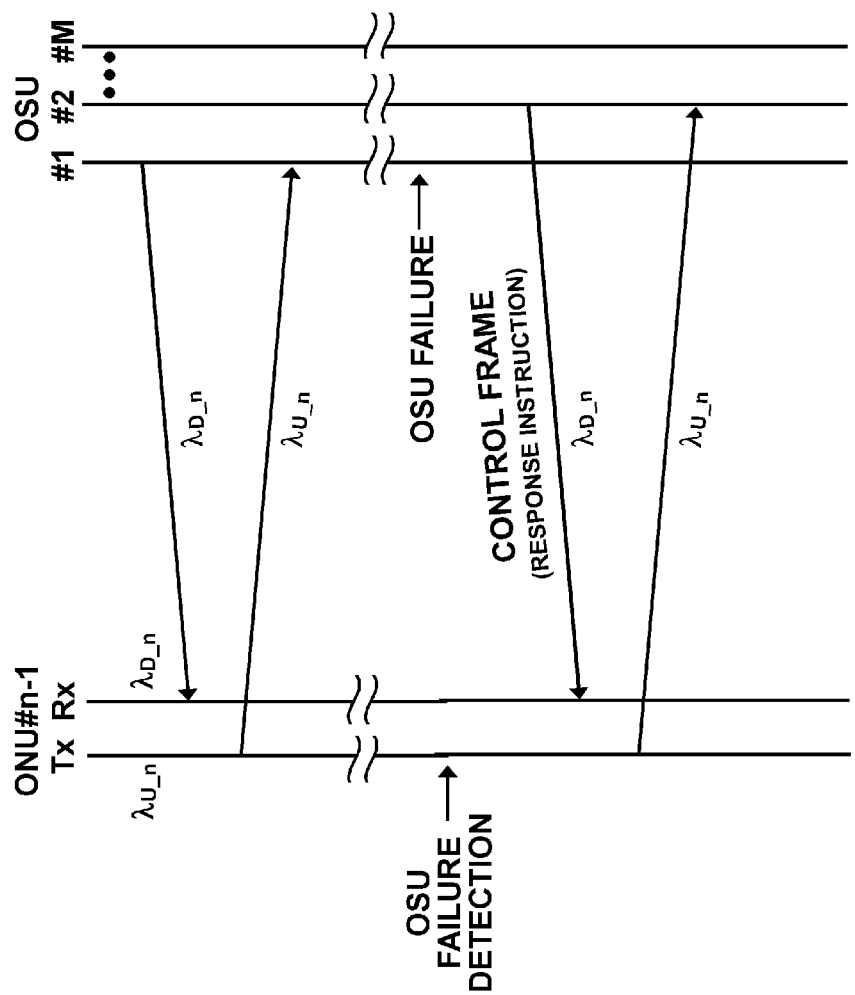
FIG. 14 is a diagram for describing a protection method according to the present disclosure.

Next, a protection operation of the present embodiment will be described. FIG. 14 illustrates a case in which an ONU #n−1 logically connected to a failed OSU #1 changes a destination OSU to an OSU #2 that is designated as a backup OSU.

[Backup Designating Process, Backup Designating Unit]

In the wavelength-tunable WDM/TDM-PON configuration to which the present embodiment is applied, another backup OSU other than an OSU to which an ONU is logically connected is designated for each ONU. The backup OSU designated for each ONU may be an OSU to which one or more ONUs are logically connected and may be an OSU to which an ONU is not logically connected. The OLT in FIGS. 12 and 13 has a backup designating unit.

[Information Holding Process, First Information Holding Unit, Second Information Holding Unit]

When an ONU detects non-reception of downstream signal light for a certain period or longer, that is, when a failure in an OSU is detected, the ONU does not remove the connection information with the OLT but continuously stores the ONU identifier such as an LLID allocated from the OLT. That is, the ONU in FIGS. 12 and 13 has a second information holding unit.

The OLT can detect a failure in the OSU based on non-reception of upstream burst signal light for a certain period or longer, for example. The OLT continuously holds the information on the ONU logically connected to the failed OSU when a failure in the OSU is detected. That is, the OLT in FIGS. 12 and 13 has a first information holding unit. Moreover, the OLT delivers the ONU information held therein to the backup OSU. That is, the backup OSU of the ONU logically connected to the failed OSU takes over the ONU information. Examples of the ONU information include an ONU identifier such as an LLID allocated from the OLT and a frame round-trip time between an ONU and an OLT.

[Control Frame Transmitting Process, Control Frame Transmitting Unit]

When a failure in the OSU is detected, similarly to the protection operation in Embodiment 1, the OLT transmits a control frame to ONUs logically connected to the failed OSU to instruct the backup OSU designated to each ONU to send a response. That is, the OLT in FIGS. 12 and 13 has a control frame transmitting unit. The information that the OLT in FIG. 12 inserts in the control frame is the same as the information illustrated in FIG. 11 of Embodiment 1. The information that the OLT in FIG. 13 inserts in the control frame is the same as the information illustrated in FIG. 10 or 11 of Embodiment 1.

[Responding Process, Responding Unit]

The ONU continuously stores the ONU identifier such as the LLID allocated from the OLT at the time at which the backup OSU of the ONU logically connected to the failed OSU transmits the control frame to the ONU. Thus, as illustrated in FIG. 14, the ONU recognizes that the control frame is addressed thereto and transmits upstream burst signal light in an allowed transmission period notified in the control frame as a response. That is, the ONU in FIGS. 12 and 13 has a responding unit.

[Confirmation Process, Confirmation Unit]

The OLT checks whether the destination OSU of the ONU is changed and the protection operation is completed based on the reception of the upstream burst signal light. That is, the OLT in FIGS. 12 and 13 has a confirmation unit.

Advantageous Effects of Embodiment 2

In the protection method of the present embodiment, when an ONU logically connected to a failed OSU detects a failure in an OSU, since the ONU does not remove the connection information with an OLT and a backup OSU in the OLT takes over the information on the ONU, the discovery operation is not required. Thus, the ONU logically connected to the failed OSU can resume communication in a short period after the occurrence of a failure in the OSU.

[Supplementary Notes]

The protection method of the present embodiment will be described.

In a protection technique which uses a conventional wavelength sweeping system, since a registration process of non-registered ONUs does not start until the reception wavelength of an ONU becomes identical to the wavelength of a search signal, the period required for completing a protection operation becomes longer.

Thus, the present disclosure provides the following disclosures.

(1) A protection method of an optical communication system in which a parent node including a plurality of termination equipments and a plurality of child nodes are connected via an optical fiber transmission line, the child node can make logical connection to an arbitrary termination equipment among the plurality of termination equipments according to a wavelength tuning function of at least one of the child node and the termination equipment, and the termination equipment other than the termination equipment to which the child node is logically connected is designated as a backup termination equipment of the child node, the method including:

allowing the child node to continuously hold connection information with the parent node when a failure in the termination equipment to which the child node is logically connected is detected, allowing the parent node to continuously hold information on the child node logically connected to the failed termination equipment when a failure in the termination equipment is detected, allowing the backup termination equipment to transmit a control frame to child nodes having the same backup termination equipments as the backup termination equipment among the child nodes logically connected to the failed termination equipments, and allowing the parent node to confirm whether a logical connection destination termination equipment of the child node has been changed by receiving the upstream signal light that the child node transmitted as a response to the control frame.

(2) The protection method according to (1), wherein
when the parent node detects a failure in the termination equipment, the backup termination equipment takes over the information on the child node having the same backup termination equipments as the backup termination equipment among the child nodes logically connected to the failed termination equipment.

(3) The protection method according to (1) or (2), wherein
the child node can selectively switch the reception wavelength,
the child node is notified of the wavelength of a downstream signal light that the backup termination equipment transmits to the child node when the child node makes logical connection to the backup termination equipment, and
when a failure in the termination equipment to which the child node is logically connected is detected, the reception wavelength is selectively switched to the wavelength of the downstream signal light used for making logical connection to the backup termination equipment.

(4) The protection method according to any one of (1) to (3), wherein
the child node can switch the transmission wavelength of the upstream signal light,
the child node is notified of the wavelength of the upstream signal light that the child node transmitted to the backup termination equipment when the child node makes logical connection to the backup termination equipment, and
when a failure in the termination equipment to which the child node is logically connected is detected, the transmission wavelength of the upstream signal light is switched to the wavelength of the upstream signal light used for making logical connection to the backup termination equipment.

(5) The protection method according to any one of (1) to (3), wherein
the child node can switch the transmission wavelength of the upstream signal light,
the transmission wavelength of the upstream signal light is switched to the wavelength of the upstream signal light that the child node transmits to the backup termination equipment when the child node makes logical connection to the backup termination equipment according to a wavelength switching instruction notified in the control frame from the backup termination equipment.

According to the present disclosure, an ONU logically connected to a failed OSU switches the reception wavelength to a backup wavelength when a failure in an OSU is detected so that a control frame transmitted by the backup OSU can be received, and the backup OSU on an OLT side takes over the information on the ONU logically connected to the failed OSU so that communication can be resumed in a short period.

REFERENCE SIGNS LIST

11: optical transmitter
12: wavelength coupler/splitter
13: wavelength filter
14: photodetector
15: optical receiver
16: coherent receiver
17: local light-emitting source
18: wavelength-tunable optical transmitter
19: wavelength-tunable optical receiver
21: photodetector
22: wavelength-tunable filter
23: wavelength-tunable optical receiver
24: wavelength-tunable optical transmitter
26: wavelength coupler/splitter
27: coherent receiver
28: local light-emitting source
29: optical receiver
30: optical transmitter
51: OSU
100, 100a, 100b, 100c: OLT
151: optical coupler/splitter
152: wavelength routing unit
153: wavelength routing unit
200, 200a, 200b: ONU
250: optical fiber transmission line
300: TDM-PON
300a: WDM/TDM-PON
300b, 301b, 302b: wavelength-tunable WDM/TDM-PON
300c: wavelength-tunable WDM/TDM-PON
300d: wavelength-tunable WDM/TDM-PON
300e: wavelength-tunable WDM/TDM-PON

What is claimed is:

1. A protection method of an optical communication system in which a parent node including a plurality of termination equipments are connected to a plurality of child nodes via optical fiber transmission lines, and each child node is assigned to a termination equipment by using a wavelength tuning function of both the child node and the termination equipment, or either the child node or the termination equipment, the method comprising:

a backup designating process wherein a termination equipment, which is other than the termination equipment to which the child node is assigned, is designated as a backup termination equipment for each child node;

an information holding process wherein the child node keeps on holding its own connection information necessary for logically connecting to the parent node when the child node detects a failure in a termination equipment and the parent node keeps on holding connection information on each child node which is originally assigned to the failed termination equipment when the parent node detects a failure in a termination equipment;

a control frame transmitting process wherein the backup termination equipment for the child node which is originally assigned to the failed termination equipment launches a control frame to the child node referring to the connection information on the child node held in the parent node;

a responding process wherein the child node, which is originally assigned to the failed termination equipment, launches upstream signal as a response to the control frame referring to its own connection information held in the child node; and a confirmation process wherein the parent node confirms that the child node has been re-assigned from the failed termination equipment to the backup termination equipment triggered by the reception of the upstream signal launched from the child node in the responding process.

2. The protection method according to claim 1, wherein the backup termination equipment is notified of the connection information on the child nodes which are originally assigned to the failed termination equipment in the control frame transmitting process.

3. The protection method according to claim 1, wherein in the backup designating process, the child node is notified of a wavelength on which the backup termination equipment launches downstream signals to the child node, and the method includes a reception wavelength switching process wherein the child node changes the reception wavelength so that the child node can receive downstream signals from the backup termination equipment when the child node detects a failure in the termination equipment to which the child node is assigned.

4. The protection method according to claim 1, wherein in the backup designating process, the child node is notified of a wavelength on which the child node launches the upstream signals to the backup termination equipment, and the method includes a transmission wavelength switching process wherein the child node changes the transmission wavelength so that the backup termination equipment can receive upstream signals from the child node when the child node detects a failure in the termination equipment to which the child node is assigned.

5. The protection method according to claim 1, wherein the method includes a transmission wavelength switching process wherein the child node changes the transmission wavelength according to a wavelength switching direction included in the control frame notified in the control frame transmitting process so that the backup termination equipment can receive upstream signals from the child node.

6. The protection method according to claim 1, wherein in the optical communication system, a wavelength routing unit is placed between the parent node and the child nodes and a reception wavelength of each child node is fixed in advance, the information holding process involves holding the reception wavelength as one of the connection information on each said child node, and the control frame transmitting process involves allowing the backup termination equipment to launch the control frame on the reception wavelength by referring to the connection information on each child node.

7. The protection method according to claim 6, wherein a transmission wavelength of upstream signals launched from the child node is fixed in advance, the information holding process involves holding the transmission wavelength as one of the connection information on each child node, and the confirmation process involves setting a receiver wavelength of the backup termination equipment to the transmission wavelength of upstream signals launched from the child node so that the backup termination equipment can receive upstream signals from the child node.

8. An optical communication system comprising:

a parent node including a plurality of termination equipments;

a plurality of child nodes connected to the parent node via optical fiber transmission lines; and each child node is assigned to a termination equipment by using a wavelength tuning function of both the child node and the termination equipment, or either the child node or the termination equipment, wherein the parent node includes:

a backup designating unit that designates a termination equipment, which is other than the termination equipment to which the child node is assigned, as a backup termination equipment for each child node;

a first information holding unit that keeps on holding connection information on each child node which is originally assigned to the failed termination equipment when the parent node detects a failure in a termination equipment;

a control frame transmitting unit that allows the backup termination equipment for the child node which is originally assigned to the failed termination equipment to launch a control frame to the child node referring to the connection information on the child node held in the first information holding unit; and a confirmation unit that confirms the child node has been re-assigned from the failed termination equipment to the backup termination equipment triggered by the reception of the upstream signal launched from the child node in response to the control frame, and the child node includes:

a second information holding unit that keeps on holding the connection information for logically connecting to the parent node when the child node detects a failure in a termination equipment; and a responding unit that launches upstream signal in response to the control frame referring to the connection information held by the second information holding unit.

9. The optical communication system according to claim 8, wherein the control frame transmitting unit notifies the backup termination equipment of the connection information on the child nodes which are originally assigned to the failed termination equipment.

10. The optical communication system according to claim 8, wherein the backup designating unit notifies the child node of a wavelength on which the backup termination equipment launches downstream signals to the child node, and the wavelength tuning function of the child node changes the reception wavelength of the child node so that the child node can receive downstream signals from the backup termination equipment when the child node detects a failure in the termination equipment to which the child node is assigned.

11. The optical communication system according to claim 8, wherein the backup designating unit notifies the child node of a wavelength on which the child node launches the upstream signals to the backup termination equipment, and the wavelength tuning function of the child node changes the transmission wavelength of the child node so that the backup termination equipment can receive upstream signals from the child node when the child node detects a failure in the termination equipment to which the child node is assigned.

12. The optical communication system according to claim 8, wherein the wavelength tuning function of the child node changes the transmission wavelength of the child node according to a wavelength switching direction included in the control frame notified by the control frame transmitting unit.

13. The optical communication system according to claim 8, further comprising:

a wavelength routing unit that is placed between the parent node and the child nodes, wherein a reception wavelength of each child node is fixed in advance, the first information holding unit of the parent node holds the reception wavelength as one of the connection information on each child node, and the control frame transmitting unit of the parent node allows the backup termination equipment to launch the control frame on the reception wavelength by referring to the connection information on each child node.

14. The optical communication system according to claim 13, wherein a transmission wavelength of upstream signals launched from the child node is fixed in advance, the first information holding unit holds the transmission wavelength as one of the connection information on each child node, and the confirmation unit of the parent node sets a-receiver wavelength of the backup termination equipment to the transmission wavelength of upstream signals launched from the child node so that the backup termination equipment can receive upstream signals from the child node.

* * * * *